(12) United States Patent
Shuster

(10) Patent No.: US 8,577,698 B2
(45) Date of Patent: Nov. 5, 2013

(54) RETAIL PRICE HEDGING

(75) Inventor: Gary Stephen Shuster, Fresno, CA (US)

(73) Assignee: Intellectual Ventures I LLC, Wilmington, DE (US)

( * ) Notice: Subject to any disclaimer, the term of this patent is extended or adjusted under 35 U.S.C. 154(b) by 2244 days.

(21) Appl. No.: 11/552,894

(22) Filed: Oct. 25, 2006

(65) Prior Publication Data

US 2008/0015964 A1 Jan. 17, 2008

Related U.S. Application Data

(60) Provisional application No. 60/730,481, filed on Oct. 25, 2005.

(51) Int. Cl.
*G06Q 40/00* (2012.01)

(52) U.S. Cl.
USPC .................................. 705/4; 705/35

(58) Field of Classification Search
USPC ........................................................ 705/4
See application file for complete search history.

(56) References Cited

U.S. PATENT DOCUMENTS

| | | | |
|---|---|---|---|
| 4,795,892 A * | 1/1989 | Gilmore et al. | 235/381 |
| 6,862,580 B1 * | 3/2005 | Ford | 705/37 |
| 2003/0197060 A1 * | 10/2003 | Coyner | 235/381 |
| 2006/0036530 A1 * | 2/2006 | Shkedy | 705/37 |

* cited by examiner

*Primary Examiner* — Charles Kyle
*Assistant Examiner* — Asha Puttaiah

(57) ABSTRACT

Retail consumers may hedge the price of volatile commodities such as gasoline via the advance purchase of a policy, which may be represented by a hedge card. The card may be priced to cover uncertainty in the price of the commodity over a defined future period, plus a small profit for the card issuer, optionally plus a pre-paid residual cash value. The card may permit the purchase of a defined amount of the commodity at a price not to exceed a defined ceiling over the defined future period. The card issuer may contact with one or more fuel providers to apportion the risks and benefits of the hedge card. In the alternative, the card issuer may contract with the consumer only, and may rebate commodity purchase amounts in excess of the defined price ceiling directly to the hedge card holder.

10 Claims, 2 Drawing Sheets

RETAIL PRICE HEDGING

CROSS-REFERENCE TO RELATED APPLICATION

This application claims priority pursuant to 35 U.S.S. §119(e) to U.S. provisional application Ser. No. 60/730,481, filed Oct. 25, 2005, which application is specifically incorporated herein, in its entirety, by reference.

BACKGROUND

1. Field of the Invention

Embodiments of the present invention relate to providing retail consumers with a mechanism for hedging against increases in the price of price-volatile commodities, such as gasoline or other goods.

2. Description of Related Art

Large commercial consumers of commodities currently protect themselves from increases in commodity prices by purchasing futures contracts, options, and other financial instruments created for this purpose. For example, large consumers of fuel, such as airlines or trucking companies, may purchase fuel futures to prevent the volatility of fuel prices from having a major impact on the business. The cost of such futures contracts may thereby become a relatively minor overhead expense that that can be easily absorbed in the business's pricing structure, while the contracts minimize the impact of sudden price increases on the profitability of the business.

Small consumers of fuel, however, are practically not able to protect themselves by direct participation in the futures or options markets. Contracts covering very small, retail quantities of fuel are not available. More importantly, the financial calculations, market knowledge and trading experience needed to correctly and efficiently construct a hedge against future price increases would be beyond the capabilities of most consumers, even if retail-sized contracts were available. Small consumers have no alternative but to purchase the fuel or other commodity at current market prices. Reducing consumption becomes the only way consumers can buffer the impact of price increases, but sudden reductions are often not practicable or may have harmful side effects.

It would be desirable, therefore, to provide a tool whereby consumers can better protect themselves from sudden increases in commodity prices, such as gasoline prices.

SUMMARY

A method and system may be employed to protect retail consumers from sudden increases in commodity prices, in exchange for a modest investment in a retail price hedging contract. The price hedging contract may be associated with a retail purchase card or other article, such as a debit card, credit card, discount card, or the like. Such a card will generally but not necessarily comprise account information encoded in a magnetic, optical, and/or electronic media, usually on a small portable plastic card designed to be carried in a purse or wallet of a consumer. Various other account-encoded articles may also be used, for example, RFID wands or tags such as may be designed to attach to a keychain or the like. The card or other article may be configured to be read at the point-of-sale for a retail transaction. For example, the card may be configured to be read by a card reader associated with a gasoline pump, diesel fuel pump, propane dispenser, fuel oil dispenser, or other dispenser of a commodity. The use of a purchase card enhances the convenience with which the retail hedging may be performed, but is not required in all embodiments.

Retail price hedging contracts, also referred to herein as price insurance policies, may be offered to individual consumers by a hedge aggregator, also called an insurer. The aggregator may be a vendor of the commodity of interest, may contract with one or more vendors of the commodity, or may operate completely independently of any vendor of the commodity. To facilitate operation of a point-of-sale card, cooperation with one or more commodity vendors may be desirable.

The aggregator may contract with multiple consumers to provide protection against commodity price increases in exchange for a contract fee. The amount of the fee may be calculated to enable the aggregator to purchase hedge instruments, such as commodity futures contracts or options contracts, which may protect the aggregator from volatility in the commodity price. In an embodiment of the invention, the contract with the consumer provides a price ceiling for a defined period of time. For example, a consumer may be protected from paying more than $2.75 per gallon for the next 100 gallons purchased within six months from the time the contract is initiated. In the alternative, the consumer may agree to pay a fixed amount per gallon over the contract period. Such a contract may be offered at a lower fee than a price-ceiling contract, or even for no fee or a discount, depending on how the contract is structured. The consumer may optionally pre-pay for the commodity at the fixed price, according to this embodiment. However, either or both of pre-payment and paying a fixed price for the commodity may be less appealing to consumers than paying a somewhat higher fee to effectively place a price ceiling on future purchases, which entails less cost up-front and permits the consumer to benefit directly if prices drop. Both types of contracts may be offered, depending on consumer preferences.

The invention operates differently from a prepaid gift card, which are issued for a fixed dollar amount regardless of amount of commodity purchased. Although such cards may be issued at a discount, the consumer is not protected from increases in the price of the underlying commodity. For example, a discount of $0.05 has little benefit if the commodity price may fluctuate $0.50 or more before the card amount is exhausted. In contrast, a prepaid or credit embodiment of the present invention may provide consumers with an assurance that they will never pay more than a defined price ceiling for the commodity in question.

For example, a consumer may be issued a gasoline credit card that permits the purchase of up to 100 gallons of gasoline per month in exchange for a small monthly fee. The fee may be a fixed fee, or may be assessed based on the amount of gasoline actually purchased during the month. Furthermore, the consumer may be guaranteed not to pay more than a defined price ceiling. The price ceiling may be fixed for a period of time (e.g., $2.75 per gallon), and may be adjusted periodically. Periodic adjustments may be performed based on an index of current, past, and/or future commodity prices. For example, the ceiling may be adjusted monthly (or bi-monthly, quarterly, semi-annually, annually, or after any defined period) to a rolling average index price over a defined number of past periods, e.g., the prior 12 months. The ceiling price may be printed on monthly statements for the credit card, posted on the issuer's website, and/or, in the case where the ceiling is fixed for the life of the card, on the card itself. The card may be designed to operate only with one or more particular vendors, or may be a general-purpose credit card designed to work with any vendor that accepts credit or debit cards.

Continuing the example, the price protection card may be used in the same or similar fashion as an ordinary credit or debit card. Price controls may be implemented at the point of sale, or provided in the form of a rebate or adjustment to the monthly statement for the card, in the event the market price exceeds the price ceiling. For example, if the market price at the pump happened to be $3.00 per gallon, and the ceiling price was $2.50, the transaction could either be booked at $2.50 per gallon, or an overage of $0.50 per gallon may be credited to the consumer's account by the card issuer. If the card is a debit card of the pre-paid type, then the card may be used to purchase a defined quantity of the commodity at the fixed price; for example, a $50 card may be used to purchase 20 gallons of gasoline at a guaranteed price of $2.50 per gallon, after which it would be considered depleted. If the card is a credit card type, transactions in excess of the quantity covered by the price protection contract may merely be completed at market price.

In an alternative embodiment, a pre-paid account for a fixed quantity of commodity for a defined price may be sold directly to the consumer. A debit card may be issued to the consumer funded by the amount deposited in the pre-paid account. The debit card may be used to purchase goods at point-of-sale terminals programmed to recognize the debit card, which may be encoded with an account identifier and the fixed price information, or a link to the fixed price information. The point-of-sale terminal may then adjust the transaction price to the fixed price indicated on the card, until the account is depleted. The account/debit card may be sold at cost, or even at a discount, particularly if the seller is a vendor of the commodity sold. The vendor may book the sale as an advance purchase, and profits from the float between the time the account is opened until it is depleted, plus any unredeemed amounts from lost or forgotten debit cards. The vendor may also benefit if the spot price drops. The vendor may also purchase futures or options, as in other embodiments, to hedge against upward price risk.

For example, a consumer may purchase a "Gasco" gasoline card good for 500 gallons of gasoline at a time when the spot price of gasoline is $2.00 per gallon. The cost of the card is $1000. The consumer may use the card at any Gasco pump to purchase 500 gallons of gasoline at the fixed price of $2.00. After the specified number of gallons has been purchased using the card, it is considered depleted. If the Gasco spot retail price is higher, e.g. $3.00 per gallon, it will nonetheless dispense gasoline to the cardholder at the fixed price of $2.00 per gallon. Likewise, if the spot price drops below the price ceiling, gasoline may be dispensed at the fixed price. In the alternative, gasoline may be dispensed at the lower spot price, depending on how the card is marketed, with the account credited an amount of gallons determined from the price difference. For example, if the fixed card price is $2.00 per gallon and the spot terminal price is $1.50, when 10 gallons are pumped, the account may optionally be credited an amount equal to the amount of gas pumped times the price difference between the spot price and the fixed price, divided by the spot price. In this example, the credit amount would be 10 gallons times $0.50 per gallon, divided by $1.50 per gallon, equals 3.33 gallons.

No time limitation need be placed on use of a card of the prepaid debit type, as the account is prepaid. As an additional inducement to the consumer, the vendor may offer to refund any unredeemed amount for cash value at any time. For example, if 100 gallons remain in the account but the spot price has dropped to $1.50 per gallon, the consumer may be permitted to exchange the remaining gallons for $200 cash. Account credits when the spot price falls below the card price, as described above, may also allay consumer fears and encourage the purchase of prepaid, fixed price cards.

In the alternative to cards of a credit or debit type, a passive card may be issued. The passive card may be configured to facilitate tracking of the commodity transactions, specifically of the price paid, quantity purchased, and transaction date. Periodically, the card issuer may credit or debit the user account an amount determined by the price ceiling and other terms of the hedging contract. For example, the user may be credited for amounts paid in excess of the guaranteed price ceiling within the contract period, up to the quantity limit on the card.

The card issuer may protect itself from exposure to price volatility by aggregating the risks across numerous account holders and purchasing appropriate financial instruments to lessen or eliminate exposure to financial risk. Embodiments of the invention are not limited to a particular method of hedging the back-end risk. One of ordinary skill in the art of financial instruments will be able to develop an appropriate hedging program, given the terms of the various retail hedging contracts, market conditions for the commodity of interest, and the acceptable risk to the aggregator. The costs of purchasing the appropriate financial instruments or otherwise insuring the back-end risks may be recouped by fees charged to users of the system, discounts offered by commodity vendors, interest charged on credit balances, advertising fees, or other ways of deriving income from consumer accounts.

A more complete understanding of the method and system for retail price hedging will be afforded to those skilled in the art, as well as a realization of additional advantages and objects thereof, by a consideration of the following detailed description of the various embodiments. Reference will be made to the appended sheets of drawings which will first be described briefly.

DETAILED DESCRIPTION OF VARIOUS EMBODIMENTS

Figure 1:
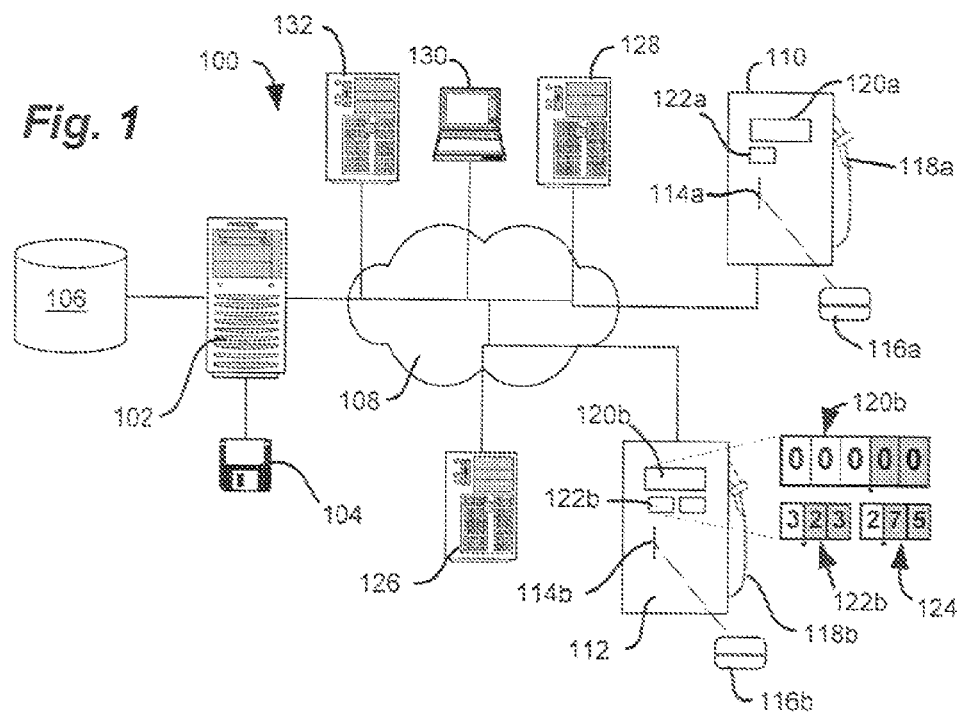
FIG. 1 is a schematic diagram showing aspects of a system for managing a retail price insurance system according to an embodiment of the invention.

In the detailed description that follows, like element numerals are used to indicate like elements appearing in one or more of the figures. FIG. 1 is a schematic diagram showing aspects of a system 100 for managing a retail price insurance system according to an embodiment of the invention. It should be appreciated that the system may be implemented on any suitable computing platform.

System 100 may comprise any suitable computer 102, for example a general-purpose or a special-purpose computer, or a bank or other network of cooperating computers, configured to carry out steps of the methods described in this disclosure. Instructions for performing steps of the methods may be encoded on any suitable magnetic, optical, or other digital storage medium 104 using any suitable programming language. The instructions should be configured to cause the computer to perform operations as described herein. In addition, computer 102 may be operably connected to a database or other storage operator 106 for holding data used in the methods described herein, for example, account and account holder identifying information, purchase records, and price insurance policy records. One of ordinary skill may construct a suitable database or other computer storage record based on the disclosure herein.

Computer 102 may be connected via any suitable communications network 108 to a plurality of point-of-sale terminals 110, 112 (two of many shown). Network 108 may comprise elements of different networks, for example wired and wireless elements. The point-of-sale terminals may be configured to receive and process purchaser account data. For example, the terminals may be equipped with card readers 114a, 114b for reading magnetic media cards 116a, 116b. Other methods of providing consumer data to a point-of-sale machine are known in the art, for example, optical codes/readers or RFID devices, and any suitable method may be used.

The point-of-sale terminals may optionally include a product dispensing apparatus 118a, 118b. For example, in the case of a gasoline or other fuel dispensing pump, the apparatus may comprise a gasoline or other fuel pump and associated equipment for delivering the fuel to a tank. The dispensing apparatus may be metered and controlled by a processor associated with the point of sale terminals 110, 112. The processor may use a metering signal to control a total sale amount shown on a sales display 120a, 120b, as known in the art. A per-unit price for the sale, such as a price-per-gallon, may be displayed on a second display 122a, 122b. The total transaction amount may be determined by multiplying the amount of product dispensed, as indicated by a metering signal, by the per-unit price as shown in the price display, e.g., 122b.

Optionally, a terminal such as terminal 112 may be equipped with a second per-unit price display 124, which may display a special price offered to a purchaser holding a price insurance policy as disclosed herein. Upon reading card 116b, the terminal 112 may transmit account information to a control server 102, which may consult database 106 to determine the status of the account. If the account holder is entitled to price protection, an appropriate signal may be transmitted back to the terminal 112. For example, a signal may be transmitted indicating that the purchaser is authorized to purchase up to 100 gallons of fuel at the price of $2.75, which may be less than a regular market price, e.g., $3.23. The special price may then be displayed on a second display 124. In addition, or in the alternative, the regular price shown on the first display 122b may be changed to the special price for the duration of the transaction.

Yet another alternative is to provide no indication of the special price on the face of terminal 112, and simply credit the purchaser account an amount computed by the excess of the regular price over the price ceiling, multiplied by the quantity of fuel purchased. Either way, after the sale is completed, the pint of sale terminal may transmit the sales data, including the purchasing account, quantity and type of product purchased, price paid, and transaction date to the system computer 102 for updating system database 106 with the new information.

Communications with system computer 102 need not be direct. For example, terminal 112 may communicate with a sales computer 126 that may be operated, for example, by a vendor entity separate from an insuring entity operating system computer 102. Sales computer 126 may relay selected information to the system computer 102. In turn, system computer 102 may relay information about the purchaser's price insurance status to sales computer 126, which, in turn, may provide an appropriate control or information signal for terminal 112. In the alternative, one or more point-of-sale terminals may communicate directly with system computer 102.

In an embodiment of the invention, price insurance may be made available for purchases made from different vendors. Different point-of-sale terminals may therefore be controlled by different computers, which may relay information to the insurance system computer 102. For example, terminal 112 may belong to a first vendor operating sales computer 126, which communicates to insurance system computer 102. Terminal 110 may belong to a second vendor operating sales computer 128, which communicates separately with system computer 102.

Various purchasers of insurance policies may also connect to system 102 or to an affiliated computer to complete a purchase of a price insurance policy. For example, system 102 may be used to operate, or as a data back-end for a web site operating to market and sell price insurance policies. Any person may purchase a policy by connecting with the web site via any suitable network client 130. Of course, client 130 may be operated by a local representative or merchant using the client to sell multiple insurance policies to different end users, optionally in exchange for a sale commission.

Optionally, system 102 may also be connected to a financial services server 132, which may offer automated trading services such as, for example, may enable server 102 to purchase futures or options designed to hedge outstanding insurance policies. Automated trading systems are known in the art, and a skilled operator of such systems should be able to develop an algorithm for automatically purchasing appropriate hedging instruments depending on the aggregate status of issued price insurance policies. To use a simple example, if insurance policies are sold guaranteeing pricing, in aggregate, for 3000 barrels of unleaded gasoline at $2.50 over the next three months, and if a relatively level consumption rate is anticipated, then the algorithm may specify purchase of three options for 1000 barrels each at a strike price of $2.50, expiring in sequence over the three-month period. More sophisticated algorithms may be developed by a skilled operator. Whatever hedging algorithm is adopted may be automatically implemented via a connection to an automatic trading system computer 132. In the alternative, hedging transactions may be manually placed by a human operator, or omitted entirely.

Figure 2:
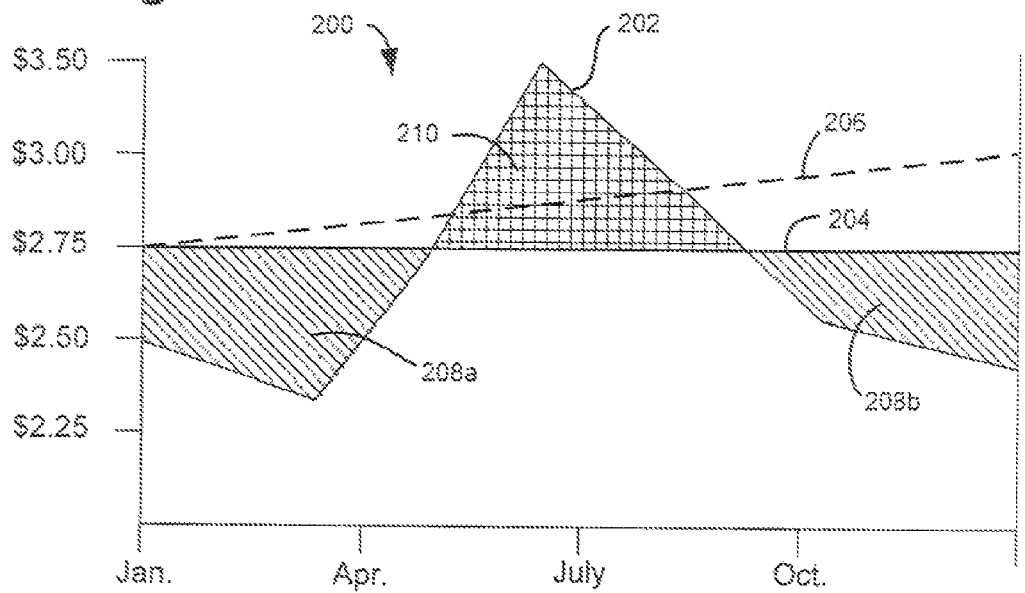
FIG. 2 is a chart showing exemplary aspects of an operating price insurance system according to an embodiment of the invention.

FIG. 2 is a chart 200 exemplifying operation of the system and benefits to the consumer. Spot price line 202 represents a hypothetical commodity price fluctuation over a one-year period. In this example, price for the commodity fluctuates between a low of about $2.40 at the end of March to a high of about $3.50 at the beginning of July. In January, a commodity purchaser desires to purchase price insurance for the entire year. The spot price at this time is $2.50, but to keep premiums lower, the purchaser selects a price ceiling of $2.75 for the entire year, represented by the horizontal line 204. The price ceiling need not be fixed, but may vary during the insured period as exemplified by the sloped line 206. The price ceiling may be defined by any suitable function, including a step function, fixed ceiling, rolling average, or any desired function. For purposes of simplicity, a fixed ceiling is used in this example.

Continuing the example of FIG. 2, during the period from January until May, the spot price 202 remains below the ceiling 204. The consumer may therefore merely pay the spot price and may thus receive no benefit from the insurance. The amount of commodity purchases times the difference between the price ceiling and the spot price during this period may be represented by area 208a. Beginning around May until October, the spot price exceeds the ceiling. During this period, the consumer may receive a credit on his insurance account, which optionally may be credited to a credit card account or debit card account used for purchase of the commodity in question. Area 210 represents a potential credit amount that may be available during this period, which may be payable as a refund or reimbursement, or optionally as a price control implemented at the point of sale. From October until the end of the year, the price falls below the ceiling price 204 again, represented by area 208b. The consumer may save more than the total premium paid during the period represented by area 210. Even if the gross financial benefit 210 of the policy does not exceed the premium paid, the consumer may still benefit from the assurance that the price will not exceed a ceiling amount. The insurer may use the premium paid to hedge against the risk, and if hedging is skillfully performed, the insurer may fare about the same regardless of the price behavior during the insurance period.

It should be apparent that a price insurance policy may be designed to cover a defined quantity of product. If unlimited product purchases are permitted, it may not be possible for the price insurer to construct a hedge against the insurance risk. Likewise, the policy holder might be tempted to purchase and resell the commodity or otherwise consumer more than is normal whenever the spot price exceeds the ceiling. Suitable quantity limitations may be defined in terms of time periods, for example, no more than "X" number of units per month over the policy period. Naturally, premiums may be set according to the level of the price ceiling, the policy period and the quantity covered.

Figure 3:
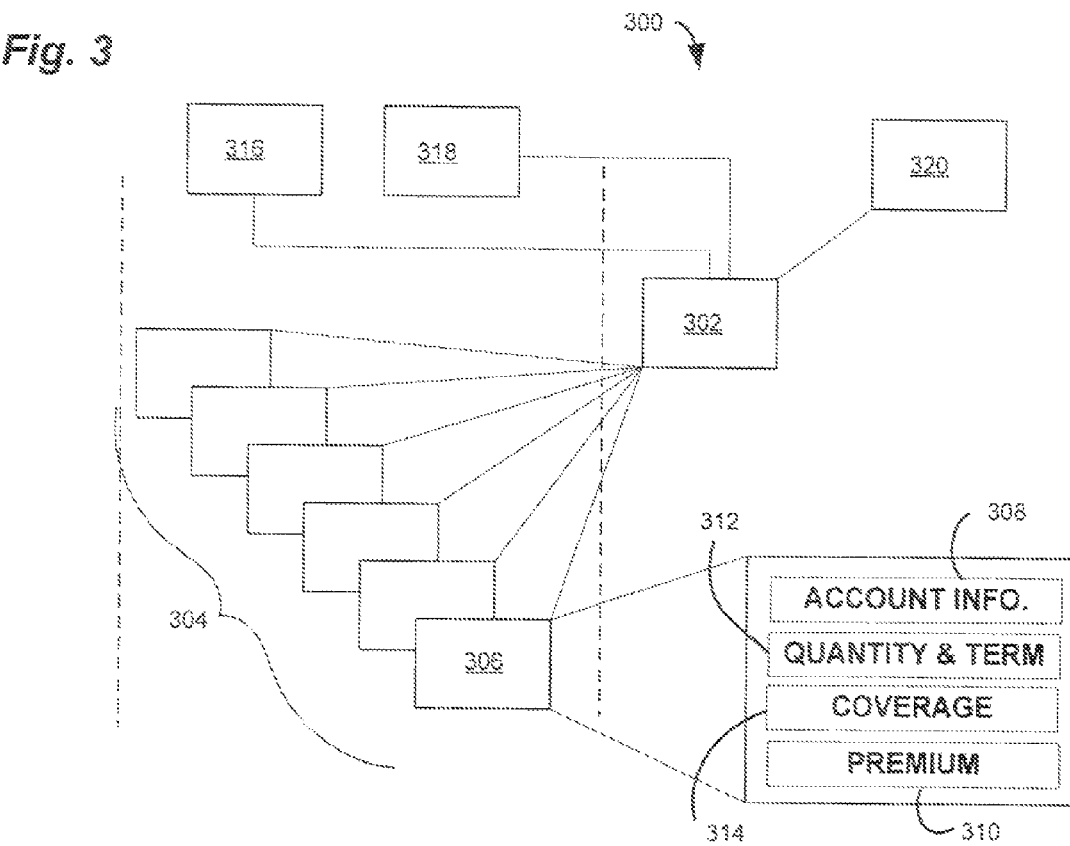
FIG. 3 is a block diagram showing exemplary aspect of a system for retail price insurance according to an embodiment of the invention.

FIG. 3 is a block diagram showing exemplary aspects of a system 300 for retail price insurance according to an embodiment of the invention. An insurer 302 may execute multiple insurance contracts or policies with multiple commodity purchasers or consumers 304. As used herein, the term "insurance," "insurer," "policy," "policyholder" and similar terms should not be taken as limiting to an insurance relationship as may be defined by federal or state law. Rather, what is intended is a retail hedging contract that may resemble an insurance policy in some respects, but may or may not be considered as constituting insurance for various legal purposes. "Price insurance" as used herein denotes the retail price hedging contract as described herein, wherein the consumer is protected from price increases in a defined product over a defined period over a defined price ceiling. It may be drawn up as a contract or financial instrument. As a retail product, it may be accompanied by a purchase card used to track purchases of the commodity over the period in question. The purchase card may also serve as a credit card or debit card, such as a fit card, if desired.

Each consumer, e.g., consumer 306, may contract with insurer 302 to define a particular price hedging agreement or "insurance policy." In an embodiment of the invention, the policy may include account information 308 for one of a plurality of retail consumers of a product. Account information may include an account number or other identifier for the policy, and identifying information for the policy holder and insurer. A monetary premium amount 310 may also be specified. The premium may be set to compensate the insurer for the price risk and enable a profit. In cases where the insurance is allied with some other product, such as a credit card, other income may be derived from the policy holder (or holders in aggregate) that may be used to offset the premium amount. The policy may also comprise insurance policy limits 312, 314 defining the limitations on the price protection offered. These limitations may include, for example, a defined period of time covered by the contract and a defined limit on quantity of product covered by the contract, collectively indicated in FIG. 3 as "quantity and term" 312. In addition, the limitations may comprise identification of a defined product, e.g., unleaded gasoline octane 87 sold by any of companies 'X' or 'Y', and a defined price ceiling for the product, indicated collectively as "coverage" 314. Similar agreements may be made with each of consumers 304.

Consumers may separately purchase the indicated commodity from designated vendors 316, 318. Each of these vendors may communicate with the insurer 302, such as by using an automated or semi-automated point-of-sale terminal, or by any suitable method. Insurer 302 may then issue credits as required by the policy to either of the individual consumers 304 or to the cooperating vendors 316, 318, depending on predefined agreements between the parties. Insurer 302 may purchase financial instruments as desired to hedge against the risk associated with the policies granted to consumers, e.g., via any suitable broker 320.

Figure 4:
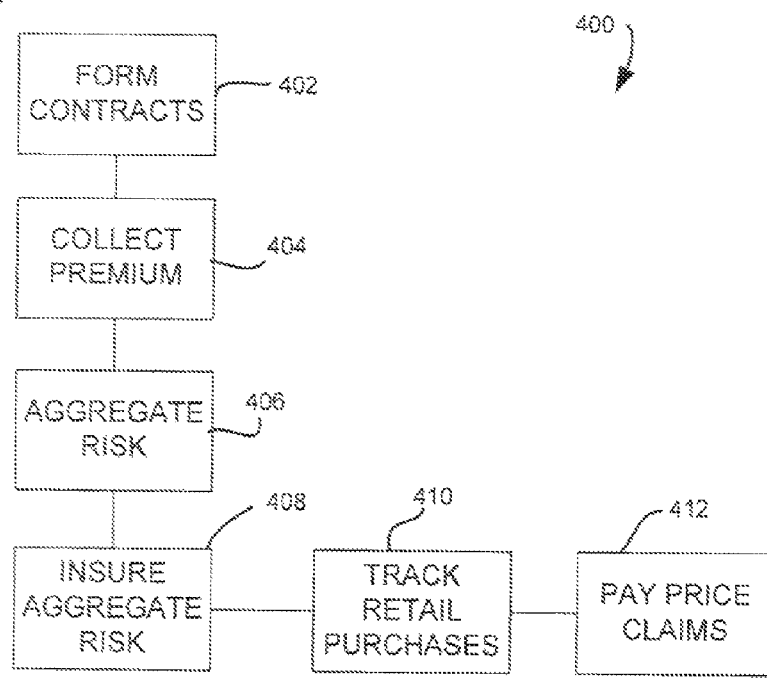
FIG. 4 is a flow diagram showing exemplary steps of a price insurance method according to an embodiment of the invention.

FIG. 4 is a flow diagram showing exemplary steps of a price insurance method according to an embodiment of the invention. At step 402, a plurality of price insurance policies or retail price hedging contracts may be defined. Each may comprise account information for one of a plurality of retail consumers of a product, a monetary premium amount and insurance policy limits comprising a defined period of time covered by the contract, a defined product, a defined price ceiling for the product, and/or a defined limit on quantity of product covered by the contract. These terms and limits may be defined in any suitable manner, for example, by interaction of each user with a web site or other network site, either directly or through a sales agent. Contract terms may vary within a defined range of values; for example, different ceiling prices may be offered at different premium rates. Other limitations affecting rates may include the product covered, the period of coverage and maximum quantity of product covered. In an embodiment of the invention, the policy may comprise the right to purchase a defined quantity of product at or below a fixed price, in exchange for a prepaid deposit.

At step 404, a premium may be defined and collected to cover anticipated hedging costs and a profit for the insurer. A premium may be collected at the beginning of the policy period or spread over the policy period. In an embodiment of the invention, no premium is collected expressly as such. This may be useful, for example, when offering price protection as a marketing inducement for other services, such as a credit card or loyalty card. In such case, the price ceiling may be set high enough such that the cost of insurance may be recouped in some other fashion, including but not limited to interest on a credit account, advertising fees, vendor subsidies, profits on sale of the commodity, interest on prepaid accounts, or other income. The collection of a premium is therefore optional. In other words, a premium may be defined as being greater than zero, zero, or less than zero, depending on offsetting income and the targeted level of profitability.

At step 406, risk represented by multiple price insurance policies may be aggregated. In the simplest case of multiple policies executed at the same time with identical terms and limitations, the risk may be simply summed. In the more usual cases, some differences may exist between the policies, so some other method of comparing and combining insured risk may be necessary.

At step 408, the entity granting the price insurance policies to the consumers may obtain financial instruments to hedge the aggregate risk, such as futures or options on futures for the commodity in question. Those of ordinary skill in the art may construct suitable hedges to mitigate the aggregate risk. In the alternative, or in addition, the insurer may self-insure against the risk in return for the premium paid. This may be appropriate, for example, if the insurer is also a producer of the commodity in question. Such a producer may be assured of a profit at the ceiling price, and in return for the premium paid merely forgoes the additional profit that may be earned if the spot price exceeds the ceiling price.

At step 410, purchase information concerning retail purchases of the product by each of the plurality of retail consumers may be tracked. The purchase information may comprise a purchaser account identifier, a measurement of quantity of product purchased, a purchase date, and a price paid for the product. This and other information may be collected at the point-of-sale and reported to a central data collection site such as by a vendor point-of-sale terminal. An account provided by a consumer, such as by using a loyalty card, credit card, debit card, or just entering an account into a terminal, may be combined with sales information as measured by a scale, flow meter, or other measuring device, and price and time/date information as provided by a vendor computer. Purchase information may be maintained in a database or any other suitable electronic storage. The aggregate risk profile borne by the insurer may change as product is purchased and the insurance period runs down. Accordingly, the aggregate risk may be re-evaluated periodically, and the insurer's hedge may be adjusted to more efficiently protect only what is needed. Tracking may also be used for calculation of price claims.

At step 412, a credit amount associated with a purchaser account for each of the retail consumers based on their respective price insurance policy limits and the purchase information may be calculated. For example, up to the quantity limit on the policy, the credit may be defined as the difference between the spot price and the price ceiling per unit measure (assuming the spot price is higher than the ceiling price), multiplied by the quantity purchased in the relevant period. Measures may be taken to encourage policy holders to purchase the commodity at the best price available in a given area from participating vendors. For example, the credit may be limited to the difference between the best available price in an area and the ceiling price, instead of the price actually paid.

The calculated credit may be paid directly to each of the retail consumers, either as a cash payment or as a credit to a purchaser account. In the alternative, the credit may be paid directly to at least one retail seller of the product, in exchange for the retail seller discounting the retail purchases of the product to a price not exceeding the defined price ceiling. In such case, in an embodiment of the invention, information may be communicated to the point-of-sale terminals, configured to cause the point-of-sale terminals to dispense the product at a price not exceeding the defined price ceiling.

Credit accounts may be maintained for purchase of the product at a price not exceeding the price ceiling. Each of the credit accounts may be established for a corresponding one of the plurality of retail consumers in association with the price insurance policies. Likewise, debit accounts may be maintained for pre-funded accounts associated with a price insurance policy, or otherwise configured so that when the account is used for the purchase of a covered product, the transaction occurs at a price not greater than a defined price ceiling amount.

Having thus described various embodiments of the system and method for retail price hedging. It should be apparent to those skilled in the art that certain advantages of the within system may be achieved. It should also be appreciated that various modifications, adaptations, and alternative embodiments thereof may be made within the scope and spirit of the present invention, which is not limited to the described embodiments.

What is claimed is:

1. A method for providing price insurance for retail consumers of a product, the method configured for execution on a computing device, the method comprising:
    defining one or more price insurance policies comprising account information for respective retail consumers of a product and insurance policy limits comprising a defined product, a defined price ceiling for the product, and a defined limit on quantity of product covered;
    receiving at a computing device from a point-of-sale terminal in communication with a product distribution device purchase information concerning a retail purchase transaction for the product by an insured one of the plurality of retail consumers, the purchase information comprising an account identifier, a measurement of product quantity purchased or to be purchased, and a retail price for the product;
    determining by the computing device whether the retail price exceeds the price ceiling of the insurance policy associated with the one of the plurality of retail consumers; and
    in response to determining that the retail price for the product information exceeds the price ceiling of the insurance policy associated with the one of the plurality of retail consumers, transmitting from the computing device to the point-of-sale terminal a signal configured to cause the point-of-sale terminal to adjust the retail price to an adjusted price not greater than the price ceiling.

2. The method of claim 1, wherein the price insurance policies a indicate respective monetary premium amounts to be paid by respective retail consumers.

3. The method of claim 1, further comprising defining the one or more insurance policy limits each comprising a defined period of time covered.

4. The method of claim 1, further comprising receiving purchase information regarding transactions of respective retail consumers from a plurality of point-of-sale terminals configured for dispensing the product to the retail consumers.

5. The method of claim 4, further comprising providing signals to respective point-of-sale terminals configured to cause the point-of-sale terminals to dispense the product at prices not exceeding the defined price ceilings of the respective insurance policies of the retail consumers.

6. The method of claim 1, further comprising maintaining credit accounts for purchase of the product at a price not exceeding the price ceiling, each of the credit accounts established for a corresponding one of the plurality of retail consumers in association with the price insurance policies.

7. The method of claim 1, further comprising tracking credit cards issued to the plurality of retail consumers, the credit cards configured for credit purchases of the product and for use in tracking the purchase information by providing a purchaser account identifier at points-of-sale.

8. The method of claim 1, further comprising maintaining a plurality of prepaid purchase accounts for purchase of the product at a price not exceeding the price ceiling, each of the purchase accounts established for a corresponding one of the plurality of retail consumers in association with the price insurance policies.

9. The method of claim 1, further comprising tracking debit cards issued to the plurality of retail consumers, the debit cards configured for debit purchases of the product and for use in tracking the purchase information by providing a purchaser account identifier at points-of-sale.

10. The method of claim 1, further comprising defining the price ceiling to be a fixed price for a defined period.

\* \* \* \* \*

UNITED STATES PATENT AND TRADEMARK OFFICE
CERTIFICATE OF CORRECTION

Page 1 of 1

PATENT NO. : 8,577,698 B2
APPLICATION NO. : 11/552894
DATED : November 5, 2013
INVENTOR(S) : Shuster It is certified that error appears in the above-identified patent and that said Letters Patent is hereby corrected as shown below:

In the Specification

In Column 3, Line 9, delete "overage" and insert -- average --, therefor.

In Column 5, Line 34, delete "shown in the" and insert -- shown on the --, therefor.

In Column 7, Line 25, delete "consumer" and insert -- consume --, therefor.

In Column 7, Line 51, delete "fit card," and insert -- gift card, --, therefor.

In Column 9, Line 16, delete "collection site" and insert -- collection site, --, therefor.

Signed and Sealed this
Twenty-fourth Day of June, 2014

Michelle K. Lee
*Deputy Director of the United States Patent and Trademark Office*